United States Patent [19]

Matsuura et al.

[11] Patent Number: 5,082,818

[45] Date of Patent: * Jan. 21, 1992

[54] PRODUCTION OF ALPHA-OLEFIN POLYMERS

[75] Inventors: Mitsuyuki Matsuura; Takashi Fujita, both of Yokkaichi, Japan

[73] Assignee: Mitsubishi Petrochemical Company Limited, Tokyo, Japan

[*] Notice: The portion of the term of this patent subsequent to Mar. 21, 2006 has been disclaimed.

[21] Appl. No.: 461,756

[22] Filed: Jan. 8, 1990

[30] Foreign Application Priority Data

Jan. 10, 1989 [JP] Japan .................................. 1-3048

[51] Int. Cl.$^5$ .............................. C08F 4/656
[52] U.S. Cl. ...................... 502/119; 502/121; 502/122; 526/125
[58] Field of Search ............... 502/119, 121, 122, 125

[56] References Cited

U.S. PATENT DOCUMENTS 4,814,314  3/1989  Matsuura et al. ............ 502/119 X
4,952,649  8/1990  Kioka et al. ................. 502/119 X

*Primary Examiner*—Patrick P. Garvin
*Attorney, Agent, or Firm*—Oblon, Spivak, McClelland, Maier & Neustadt

[57] ABSTRACT

Ziegler polymerization of α-olefins is disclosed which is characterized by a solid catalyst component used in the Ziegler-type catalyst. The solid catalyst component, Component (A), comprises Component (i) which is a solid catalyst component for a Ziegler-type catalyst comprising Ti, Mg and a halogen; Component (ii) which is a silicon compound represented by a formula $$R^1R^2{}_{3-n}Si(OR^3)_n$$

wherein $R^1$ indicates a branched hydrocarbyl group, $R^2$ which may be the same as or different from $R^1$ indicates a hydrocarbyl group, $R^3$ which may be the same as or different from $R^1$ and/or $R^2$ indicates a hydrocarbyl group, and n is a number satisfying an equation $1 \leq n \leq 3$;

Component (iii) a halogen compound of S or P; and
Component (iv) an organometal compound of a metal of Groups I to IV of the Periodic Table.

24 Claims, No Drawings

PRODUCTION OF ALPHA-OLEFIN POLYMERS

BACKGROUND OF THE INVENTION

1. Field of the Art

The present invention relates to Ziegler polymerization of α-olefins. More particularly, the present invention is concerned with Ziegler polymerization of α-olefins characterized by, among others, the solid catalyst components comprising a transition metal in Ziegler-type catalysts.

Use of the solid catalyst component in accordance with the present invention in Ziegler-type catalysts as the transition metal component will make it possible to produce polymers endowed with improved stereoregularity with less amount of polymer by-products in a higher yield.

2. Background of the invention

Although the catalysts heretofore proposed for the polymerization of olefins comprising a solid catalyst component containing titanium, magnesium and a halogen as the essential ingredients and an organoaluminum have shown extremely high activity, yet it has been necessary to use an electron donative compound (electron donor) during polymerization, when the high stereoregularity of polymer products is desired.

However, problems with such catalysts using the electron donative compound as the third component (outside donor) are that difficulties are encountered in the control of the performance of polymer products inclusive of the regulation of their molecular weight for reasons that the velocity of polymerization drops due to the reaction of the organoaluminum compound with the electron donative compound, when the polymerization temperature is elevated so as to increase the velocity of polymerization, which reaction is so accelerated that an attempt to increase the yield (or productivity) of polymers by doing so is subject to restriction. Furthermore, considerable amount of the electron donative compound is required for obtaining stereoregularity at a high level desired, and the polymers thereby produced have smell due to the electron donative compound used and contained in the polymer when conventional catalyst-removal processing is omitted.

Therefore, it is now desired to develop catalyst systems which overcome the aforesaid problems and make it possible to produce highly stereoregular polymers with improved catalytic yields but without using any electron donative compound as the third component, i.e. what is called "outside electron donor".

Related Art

Japanese Patent Laid-Open Publication No. 138715/1983 discloses a process for carrying out polymerization with a catalyst system free from any outside electron donor, which is composed of a solid component obtained by permitting (1) a titanium composite containing as the essential ingredients tetravalent titanium, magnesium, a halogen and an electron donor to react with (2) an organosilicon compound having an Si-O-C bond in the presence of an organoaluminum compound, or treating said titanium composite with an organoaluminum compound and, thereafter, permitting it to react with said organosilicon compound; and an organoaluminum compound.

However, it is found that such a proposal shows some signs of improvement in connection with the solving of the aforesaid problems, but there would be still left much to be improved for reasons that: limitation is imposed upon the performance of the obtained polymer products; the catalyst activity deteriorates with time; restriction is placed upon the quantitative ratio of the titanium component and organoaluminum compound used at the time of polymerization.

Japanese Patent Laid-Open Publication No. 187707/1987 discloses use of specified alkoxysilicon compounds, whereby the requirement on the quantity of organoaluminum compounds in polymerization was considerably less demanding. It may, however, be that such a high yield of polymer per catalyst that makes it possible to eliminate the catalyst removal processing is not always obtained for polymers with a molecular weight controlled or copolymers.

Furthermore, crystalline polypropylene, while having excellent characteristics of rigidity and heat resistance, had on the other hand the problem of low impact strength, particularly low impact strength at a low temperature.

As the method for improving this point, there have been already known a method of forming a block copolymer by polymerizing stepwise propylene and ethylene or another olefin (Japanese Patent Publications Nos. 11230/1968, 16668/1969, 20621/1969, 24593/1974, 30264/1974, Japanese Laid-open Patent Publications Nos. 25781/1973, 115296/1975, 35789/1978 and 110072/1979).

However, when propylene and ethylene are polymerized in two stages or multiple stages, although impact resistance may be improved, there ensues on the other hand the problem that polymers of low crystallinity are formed in a large amount, because the product contains copolymer portions.

Also, for improvement of impact strength of a block copolymer, it has been generally practiced to increase an amount of a rubbery copolymer formed in the block copolymerization. However, the polymer particles tend to be increased in tackiness with the increase of elastomeric copolymers, whereby sticking between polymer particles or sticking of the polymer particles onto the device inner wall may occur, whereby it becomes frequently difficult to perform stable running of a polymer production for a long term. Particularly, in polymerization without employment of a solvent, for example, gas phase polymerization, worsening of flowability due to sticking of polymer particles is a very great problem in running operation. Accordingly, it has been desired to develop a technique which can improve running stability by preventing sticking of polymer particles, even when an amount of rubbery polymers formed may be increased.

SUMMARY OF THE INVENTION

The present invention is based on the discovery that the above problems can be solved by use of a specified solid catalyst component in Ziegler-type catalysts.

More particularly, the present invention, in one aspect, presents a solid catalyst component for Ziegler-type catalysts, which solid catalyst component is obtained by contacting the following Components (i) to (iv):

Component (i) which is a solid catalyst component for Ziegler-type catalysts comprising titanium, magnesium and a halogen as the essential components;

Component (ii) which is a silicon compound represented by a formula $$R^1R^2{}_{3-n}Si(OR^3)_n$$

wherein $R^1$ indicates a branched hydrocarbyl group, $R^2$ which may be the same as or different from $R^1$ indicates a hydrocarbyl group, $R^3$ which may be the same as or different from $R^1$ and/or $R^2$ indicates a hydrocarbyl group, and n is a number satisfying an equation $1 \leq n \leq 3$;

Component (iii) which is a halogen compound of sulfur or phosphorus; and

Component (iv) which is an organometal compound of a metal of the Groups I to III of the Periodic Table.

The present invention, in another aspect, presents a catalyst for polymerizing α-olefins which comprises the following Components (A) and (B):

Component (A) which is a solid catalyst component for Ziegler-type catalysts, which solid catalyst component is obtained by contacting the following Components (i) to (iv):

Component (i) which is a solid catalyst component for Ziegler-type catalysts comprising titanium, magnesium and a halogen as the essential components;

Component (ii) which is a silicon compound represented by a formula $$R^1R^2{}_{3-n}Si(OR^3)_n$$

wherein $R^1$ indicates a branched hydrocarbyl group, $R^2$ which may be the same as or different from $R^1$ indicates a hydrocarbyl group, $R^3$ which may be the same as or different from $R^1$ and/or $R^2$ indicates a hydrocarbyl group, and n is a number satisfying an equation $1 \leq n \leq 3$;

Component (iii) which is a halogen compound of sulfur or phosphorus; and

Component (iv) which is an organometal compound of a metal of the Groups I to III of the Periodic Table; and Component (B) which is an organoaluminum compound.

The present invention, in still another aspect, presents a process for producing α-olefin polymers which comprises contacting at least one of α-olefins with a catalyst for polymerizing α-olefins thereby to polymerize the α-olefin, the catalyst for polymerizing α-olefins comprising the following Components (A) and (B):

Component (A) which is a solid catalyst component for Ziegler type catalysts, which solid catalyst component is obtained by contacting the following Components (i) to (iv):

Component (i) which is a solid catalyst component for Ziegler-type catalysts comprising titanium, magnesium and a halogen as the essential components;

Component (ii) which is a silicon compound represented by a formula $$R^1R^2{}_{3-n}Si(OR^3)_n$$

wherein $R^1$ indicates a branched hydrocarbyl group, $R^2$ which may be the same as or different from $R^1$ indicates a hydrocarbyl group, $R^3$ which may be the same as or different from $R^1$ and/or $R^2$ indicates a hydrocarbyl group, and n is a number satisfying an equation $1 \leq n \leq 3$;

Component (iii) which is a halogen compound of sulfur or phosphorus; and

Component (iv) which is an organometal compound of a metal of the Groups I to III of the Periodic Table and Component (B) which is an organoaluminum compound.

The catalyst for polymerizing α-olefins in accordance with the present invention can solve the above-mentioned problems inherent in the prior art catalysts in that, inter alia, it is possible to retain activity/stereoregularity at a high level without use at the polymerization of an electron donative compound, i.e. an outside electron donor, even at a higher polymerization temperature.

These characteristics inherent in the present invention are advantageous in view of commercial production of α-olefin polymers, and are important features of the catalyst of the present invention. The reason why the catalyst of the present invention is endowed with these characteristics has not yet been elucidated completely, but it is assumed, among others, without any intention to thereby accept any restriction, that the silicon compound (ii), the halogen compound of sulfur or phosphorus (iii) and the organometal compound (iv) may act upon each other.

Furthermore, it is possible thanks to the present invention to produce, through the use of the catalyst, propylene block copolymers having high rigidity and high impact strength at high activity, namely at high yield per catalyst, and yet stably.

Also, according to the present invention; even when elastomeric or rubbery copolymers are produced at such a high level of e.g. 60% by weight, especially when the block copolymerization is conducted in the substantial absence of a polymerization dispersant, tackiness of polymer particles produced is little, and therefore the trouble in operation which has been a problem in the prior art can be solved.

Further, by carrying out polymerization with the catalyst of the present invention, the catalyst activity can be high during polymerization of elastomeric copolymer components. In most catalyst systems known in the art, the catalyst activity will be frequently lowered during polymerization for producing elastomeric copolymer components to pose a problem. The catalyst system of the present invention is free from such problems as mentioned above to be also extremely advantageous in commercial production of propylene block copolymers.

Further, as another advantage when employing the catalyst of the present invention, good properties of the polymer particle thereby produced may be mentioned. For example, referring to polymer bulk density, it is 0.45 g/cc or higher in the present invention, and sometimes a value of 0.50 g/cc or even higher may be possible.

DETAILED DESCRIPTION OF THE INVENTION

[Catalyst]

The catalyst of the present invention comprises a combination of specific components (A) and (B). Here, the wording "comprises" does not mean that the components are limited only to those mentioned (namely, A and B), and does not exclude co-presence of other components compatible with or suited for the purpose, such as an outside electron donor which is not essential but can be used if desired.

Component (A)

The component (A) of the catalyst of the present invention is a solid catalyst component for Ziegler-type catalysts obtained by contacting the components (i) to (iv) shown below. Here, the wording "obtained by contacting" does not mean that the components are limited only to those mentioned, namely (i) to (iv), and does not exclude co-presence of other components suited for the purpose.

Component (i)

The component (i) is a solid component containing titanium, magnesium and a halogen as the essential components. Here, the wording "containing as the essential components" indicates that it can also contain other elements suited for the purpose than the three components mentioned, that these elements can exist in any desired compound suited for the purpose respectively, and also that these elements can also exist in the form mutually bonded together. Solid components containing titanium, magnesium and halogen are known per se. For example, those as disclosed in Japanese Laid-open Patent Publications Nos. 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984 and 149906/1984 may be employed.

As the magnesium compound which is the magnesium source to be used in the present invention, magnesium dihalides, dialkoxymagnesiums, alkoxymagnesium halides, magnesium oxyhalides, dialkylmagnesiums, magnesium oxide, magnesium hydroxide, carboxylates of magensium, etc. are exemplified. Among these magnesium compounds, magnesium dihalides, particularly $MgCl_2$, are preferred.

As the titanium compound which is the titanium source, compounds represented by the formula $Ti(OR^3)_{4-n}X_n$ (wherein $R^3$ is a hydrocarbyl group, preferably having about 1 to 10 carbon atoms, X represents a halogen atom and n is an integer of $0 \leq n \leq 4$) and polymers of a titanium tetraalkoxide. Specific examples may include:

titanium tetrahalides such as $TiCl_4$, $TiBr_4$ and the like:
alkoxytitanium halides such as
$Ti(OC_2H_5)Cl_3$,
$Ti(OC_2H_5)_2Cl_2$,
$Ti(OC_2H_5)_3Cl$,
$Ti(O-iC_3H_7)Cl_3$,
$Ti(O-nC_4H_9)Cl_3$,
$Ti(O-nC_4H_9)_2Cl_2$,
$Ti(OC_2H_5)Br_3$,
$Ti(OC_2H_5)(OC_4H_9)_2Cl$,
$Ti(OC-nC_4H_9)_3Cl$,
$Ti(O-C_6H_5)Cl_3$,
$Ti(O-iC_4H_9)_2Cl_2$,
$Ti(OC_5H_{11})Cl_3$,
$Ti(OC_6H_{13})Cl_3$, and the like;
and titanium tetraalkoxides such as
$Ti(OC_2H_5)_4$,
$Ti(O-iC_3H_7)_4$,
$Ti(O-nC_3H_7)_4$,
$Ti(O-nC_4H_9)_4$,
$Ti(O-iC_4H_9)_4$,
$Ti(O-nC_5H_{11})_4$,
$Ti(O-nC_6H_{13})_4$,
$Ti(O-nC_7H_{15})_4$,
$Ti(O-nC_8H_{17})_4$,
$Ti[OCH_2CH(CH_3)_2]4$, and the like.

Polymers of a titanium tetraalkoxide may include those represented by the following formula:

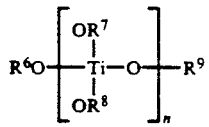

wherein, $R^6$-$R^9$ represent the same or different hydrocarbyl groups, preferably aliphatic hydrocarbyl group having 1 to 10 carbon atoms or aromatic hydrocarbyl groups, particularly aliphatic hydrocarbyl groups having 2 to 6 carbon atoms. n represents a number of 2 or more, particularly a number up to 20. The value of n should be desirably selected so that the polytitanate itself or as a solution can be provided in a liquid state for the contact step with other components. A suitable n selected in view of ease of handling may be about 2 to 14, preferably 2 to 10. Specific examples of such polytitanates may include n-butylpolytitanate (n = 2 to 10), hexylpolytitanate (n = 2 to 10), n-octylpolytitanate (n = 2 to 10), and the like. Among them, n-butylpolytitanate is preferred.

It is also possible to use, as the titanium compound for the titanium source, a molecular compound obtained by reacting an electron donor as described below with a compound $TiX'_4$ (where X' represents a halogen). Specific examples may include:
$TiCl_4 \cdot CH_3COC_2H_5$,
$TiCl_4 \cdot CH_3CO_2C_2H_5$,
$TiCl_4 \cdot C_6H_5NO_2$,
$TiCl_4 \, CH_3COCl$,
$TiCl_4 \, C_6H_5COCl$,
$TiCl_4 \cdot C_6H_5CO_2C_2H_5$,
$TiCl_4 \cdot ClCOC_2H_5$,
$TiCl_4 \cdot C_4H_4O$, and the like.

Among these titanium compounds, preferable are $TiCl_4$, $Ti(OEt)_4$, $Ti(OBu)_4$, and $Ti(OBu)Cl_3$.

As to the halogen source, it is a common practice to supply the halogen from the halide compounds of magnesium and/or titanium as described above, but it can be also supplied from non halogenating agents such as halogen compounds of aluminum, halogen compounds of silicon, halogen compounds of phosphorus, and the like.

The halogen contained in the catalyst components may be fluorine, chlorine, bromine, iodine or a mixture of these, particularly preferably chlorine.

The solid component to be used in the present invention can also include, in addition to the above essential components: a silicon compound such as $SiCl_4$, $CH_3SiCl_3$, and the like; a polymeric silicon compound having the structure represented by the following formula:

(wherein R is a hydrocarbyl group having about 1 to 10, particularly about 1 to 6 carbon atoms) and having a viscosity of about 1 centistoke to 100 centistokes, such as methylhydropolysiloxane, ethylhydropolysiloxane, phenylhydropolysiloxane, cyclohexylhydropolysiloxane, 1,1,3,3-tetramethyldisiloxane, 1,3,5,7-tetramethylcyclotetrasiloxane, 1,3,5,7,9-pentamethylcyclopentasiloxane and the like; an aluminum compound such as $Al(OiC_3H_7)_3$, $AlCl_3$, $AlBr_3$, $Al(OC_2H_5)_3$, $Al(OCH_3)_2Cl$; a boron compound such as $B(OCH_3)_3$, $B(OC_2H_5)_3$, $B(OC_6H_5)_3$; $WCl_6$ and $MoCl_5$.

These optional compounds may remain in the solid component as the components of silicon, aluminum and boron.

Further, in preparing the solid component, use can also be made of an electron donor as what is called "an inside donor".

Examples of the electron donor or the inside donor which can be used for preparation of the solid component may include oxygen-containing electron donors such as alcohols, phenols, ketones, aldehydes, carboxylic acids, esters of an organic acid or an inorganic acid, ethers, acid amides, acid anhydrides, and the like; and nitrogen-containing electron donors such as ammonia, amines, nitriles, isocyanates, and the like.

More specifically, there may be included: (a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol, isopropylbenzyl alcohol and the like; (b) phenols having 6 to 25 carbon atoms which may or may not have an alkyl group, such as phenol, cresol, xylenol, ethylphenol, propylphenol, cumylphenol, nonylphenol, naphthol and the like; (c) ketones having 3 to 15 carbon atoms, such as acetone, methyl ethyl ketone, methyl isobutyl ketone, acetophenone, benzophenone and the like; (d) aldehydes having 2 to 15 carbon atoms, such as acetaldehyde, propionaldehyde, octylaldehyde, benzaldehyde, tolualdehyde, naphthaldehyde and the like; (e) organic acid esters having 2 to 20 carbon atoms, such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarine, phthalide, ethylene carbonate, cellosolve acetate, cellosolve isobutyrate and cellosolve benzoate, etc.; (f) inorganic acid esters, such as silicates such as ethyl silicate, butyl silicate, phenyl-triethoxysilane, etc.; (g) acid halides having 2 to 15 carbon atoms, such as acetyl chloride, benzoyl chloride, toluyloic chloride, anisic chloride, phthaloyl chloride, phthaloyl isochloride and the like; (h) ethers having 2 to 20 carbon atoms, such as methyl ether, ethyl ether, isopropyl ether, butyl ether, amyl ether, tetrahydrofuran, anisole, diphenyl ether and the like; (i) acid amides, such as acetic amide, benzoic amide, toluyloic amide and the like; (j) amines, such as monomethylamine, monoethylamine, diethylamine, tributylamine, piperidine, tribenzylamine, aniline, pyridine, picoline, tetramethylethylenediamine and the like; and (k) nitriles, such as acetonitrile, benzonitrile, tolunitrile and the like. One or more of these electron donors can be used in preparing the solid catalyst component. Among them, preferred are organic acid esters and acid halides, particularly preferably phthalic acid esters, phthalic acid halides and cellosolve acetate.

The amounts of the above respective components used may be at any desired level, so long as the advantages inherent in the present invention can be attained, but, generally speaking, the following ranges are preferred.

The amount of the titanium compound used may be within the range of $1 \times 10^{-4}$ to 1000, preferably 0.01 to 10, in terms of molar ratio relative to the amount of the magnesium compound used. When a compound as the halogen source is used, its amount used may be within the range of $1 \times 10^{-2}$ to 1000, preferably 0.1 to 100, in terms of a molar ratio relative to magnesium used, irrespective of whether the titanium compound and/or the magnesium compound may contain a halogen or not.

The amount of the silicon, aluminum, boron, wolfram or molybdenum compound when used may be within the range of $1 \times 10^{-3}$ to 100, preferably 0.01 to 1, in terms of a molar ratio to the amount of the above magnesium compound used.

The amount of the electron donor compound when used may be within the range of $1 \times 10^{-3}$ to 10, preferably 0.01 to 5, in terms of a molar ratio relative to the amount of the above magnesium compound used.

The solid component for preparing the component (i) may be prepared from the titanium source, the magnesium source and the halogen source, and further optionally other components such as an electron donor according to methods mentioned below.

(a) A method in which a magnesium halide optionally together with an electron donor is contacted with a titanium compound.

alumina or magnesia is treated (b) A method in which with a phosphorus halide compound, and the product is contacted with a magnesium halide, an electron donor, a titanium halide-containing compound.

(c) A method in which the solid component obtained by contacting a magnesium halide with a titanium tetraalkoxide and a specific polymeric silicon compound is contacted with a titanium halide compound and/or a silicon halide compound.

As the polymeric silicon compound, those represented by the following formula are suitable:

wherein R is a hydrocarbyl group having about 1 to 10 carbon atoms, n is a polymerization degree such that the viscosity of the polymeric silicon compound may be 1 to 100 centistokes.

Among them, methylhydrogenpolysiloxane, 1,3,5,7-tetramethylcyclotetrasiloxane, 1,3,5,7,9-pentamethylcyclopentacycloxane, ethylhydrogenpolysiloxane, phenylhydrogenpolysiloxane, and cyclohexylhydrogen polysiloxane are preferred.

(d) A method in which a magnesium compound is dissolved in a titanium tetraalkoxide and an electron donor, and the solid component precipitated from the solution upon addition thereto of a halogenating agent or a titanium halide compound is contacted with a titanium compound.

(e) A method in which an organomagnesium compound such as Grignard reagent, etc. is reacted with a halogenating agent, a reducing agent, etc., and then the reaction product is contacted with an electron donor and a titanium compound.

(f) A method in which an alkoxymagnesium compound is contacted with a halogenating agent and/or a titanium compound in the presence or absence of an electron donor.

(g) A method in which a magnesium dihalide and a titanium tetraalkoxide and/or a polymer thereof are contacted, and subsequently contacted with a polymeric silicon compound is contacted.

Among these methods, method (c), (d) and (g) are preferable.

Contact of the three components can be also effected in the presence of a dispersing medium. As the dispersing medium in that case, hydrocarbons, halogenated hydrocarbons, dialkylsiloxanes, etc. may be exemplified. Examples of hydrocarbons may include hexane, heptane, toluene, cyclohexane and the like; examples of halogenated hydrocarbons include n-butyl chloride, 1,2-dichloroethylene, carbon tetrachloride, chlorobenzene, etc.; and examples of dialkylpolysiloxane include dimethylpolysiloxane, methylphenylpolysiloxane and the like.

According to the above preferable embodiments for preparing the solid component (i) wherein two types of contacts are practiced, it is general that dissolution of the magnesium dihalide takes place at the former contact, and precipitation of the solid containing the magnesium dihalide takes place at the latter contact. The precipitated solid should be desirably washed with a solvent compound as described above before use for the further step wherein it is contacted with the component (ii) and others.

The Component (i) can be used as such as a solid catalyst component, but can be used after it has undergone what is called preliminary polymerization wherein it is contacted, optionally in the presence of an organoaluminum compound, with an α-olefin to produce on the solid catalyst component a small amount of a polymer of the α-olefin.

Reaction conditions of the preliminary polymerization, when such is practiced, are any suitable one, and are preferably as follows.

The polymerization temperature is 0 to 80° C, preferably 10 to 60° C. Quantity of a polymer produced at the preliminary polymerization is 0.001 to 50 g, preferably 0.1 to 10 g, per gram of the solid catalyst component.

The organoaluminum compounds, when such is used, are those conventionally used in Ziegler-type catalysts, and include, for example:

$Al(C_2H_5)_3$,
$Al(iC_4H_9)_3$,
$Al(C_5H_{11})_3$,
$Al(n-C_6H_{13})_3$,
$Al(C_8H_{17})_3$,
$Al(C_{10}H_{21})_3$,
$Al(C_2H_5)_2Cl$,
$Al(iC_4H_9)_2Cl$,
$Al(C_2H_5)_2H$,
$Al(iC_4H_9)_2H$,
$Al(C_2H_5)_2(OC_2H_5)$,
methylaluminoxane, and
isobutylaluminoxane.

Preferable are $Al(C_2H_5)_3$ and $Al(iC_4H_9)_3$

Combinations of a trialkylaluminum with an alkylaluminum halide, of a trialkylaluminum with an alkylaluminum halide and an alkylaluminum ethoxide are also effective, and include, for example:

$Al(C_2H_5)_3 + Al(C_2H_5)_2Cl$,
$Al(iC_4H_9)_3 + Al(iC_4H_9)Cl$,
$Al(C_2H_5)_3 + Al(C_2H_5)_{1.5}Cl_{1.5}$, and
$Al(C_2H_5)_3 + Al(C_2H_5)_2Cl + Al(C_2H_5)_2(OC_2H_5)$.

The quantity of an organoaluminum compound in the preliminary polymerization may be such that the molar ratio of Al/Ti in the Component (A) is 1 to 20, preferably 2 to 10. The preliminary polymerization can be practiced also in the presence of an electron donor such as an alcohol, an ester or a ketone which are described hereinbefore.

The α-olefins for the preliminary polymerization include, for example, ethylene, propylene, butene-1, hexene-1, 4-methyl-pentene-1, 3-methylbutene-1, 1,5-hexadiene, styrene and vinylcyclohexane. Hydrogen gas can be used at the preliminary polymerization.

The solid catalyst components (i) which comprises titanium, magnesium and a halogen as the essential components are thus prepared.

Component (ii)

Component (ii) for preparing the Component (A) is a silicon compound expressed by a formula $$R^1R^2(OR^3)_n$$

wherein $R^1$ is a branched hydrocarbyl group, $R^2$ is a hydrocarbyl group which is the same as or different from $R^1$, $R^3$ is a hydrocarbyl group which is the same as or different from $R^1$ and/or $R^2$, and n is a number satisfying an equation $1 \leq n \leq 3$.

It is preferable that $R^1$ has a branch at the carbon atom adjacent to the silicon atom. The branch may preferably be an alkyl group, cycloalkyl group or aryl group such as phenyl or methyl-substituted phenyl group. More preferably, the carbon atom adjacent to the silicon atom, namely α-carbon atom, is a secondary or tertiary carbon atom. Most preferably, the carbon atom connected with the silicon atom is a tertiary carbon atom.

$R^1$ may have 3 to 20, preferably 4 to 10, carbon atoms.

$R^2$ may have 1 to 20, preferably 1 to 10, carbon atoms and may be in a branched or straight configuration.

$R^3$ may be an aliphatic hydrocarbyl group, and preferably is a linear aliphatic hydrocarbyl group of 1 to 4 carbon atoms.

Specific examples of the silicon compounds may include:

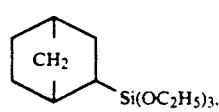

-continued

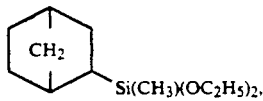

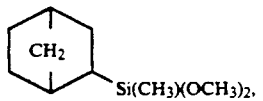

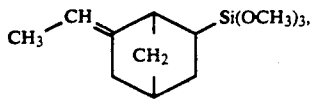

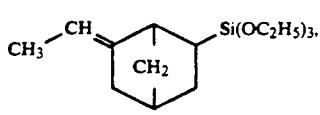

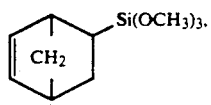

$(CH_3)_3CSi(CH_3)(OCH_3)_2$,
$(CH_3)_3CSi(HC(CH_3)_2)(OCH_3)_2$,
$(CH_3)_3CSi(CH_3)(OC_2H_5)_2$,
$(C_2H_5)_3CSi(CH_3)(OCH_3)_2$,
$(CH_3)(C_2H_5)CHSi(CH_3)(OCH_3)_2$,
$((CH_3)_2CHCH_2)_2Si(OCH_3)_2$,
$(C_2H_5)(CH_3)CSi(CH_3)(OCH_3)_2$,
$(C_2H_5)(CH_3)_2CSi(CH_3)(OC_2H_5)_2$,
$(CH_3)_3CSi(OCH_3)_3$,
$(CH_3)_3CSi(OC_2H_5)_3$,
$(C_2H_5)_3CSi(OC_2H_5)_3$,
$(CH_3)(C_2H_5)CHSi(OCH_3)_3$,
$(C_2H_5)(CH_3)_2CSi(OCH_3)_3$,
$(C_2H_5)(CH_3)_2CSi(OC_2H_5)_3$,
$(C_2H_5)_3CSi(OC_2H_5)_3$,
$(CH_3)(C_2H_5)CHSi(OCH_3)_3$,
$(CH_3)_3C)_2Si(OCH_3)_2$,

Component (iii)

Component (iii) for preparing a solid catalyst component in accordance with the present invention is a halogen compound of sulfur or phosphorus.

The halogen in these compounds may be either of F, Cl, Br or I. Among these, latter three are preferable, and chlorine is most preferable. F is preferable when used in combination with Cl.

The sulfur and the phosphorus in the halogen compounds can assume any valence possible.

The halogen compounds of sulfur as the component (iii) can be either those made up solely of sulfur and a halogen or those further comprising O, OH or N.

The halogen compounds of phosphorus as the component (iii) can be either those made up solely of phosphorus and a halogen or those further comprising an alkyl group of 1 to 20 carbon atoms, phenyl or a lower alkyl-substituted phenyl or 0.

The compounds as the component (iii) can also be those comprising both sulfur and phosphorus.

Examples of suitable halogen compounds of sulfur include $SOCl_2$, $SO_2Cl_2$, $SO_2(OH)Cl$, $SCl_2$, $SO_2ClF$, $SOClF$, $N_4S_4Cl_4$, $PSCl_3$, and the like. More preferable are $SOCl_2$ and $SO_2Cl_2$.

Examples of suitable halogen compounds of phosphorus include phosphorus trichloride, phosphorus pentachloride, phosphorus tribromide, diethyl chlorophosphite, methyl dichlorophosphite, phenyl dichlorophosphite, butyl chlorophosphite, ethyl dichlorophosphite, phosphorus oxychloride, diethyl phosphochloride, diphenyl phosphochloride, ethyl phosphorodichloridate, phenyl phosphorodichloridate, dibutyl phosphorochloridite, bis(2-ethylhexyl)phosphorochloridite, and the like. More preferable are phosphorus trichloride, phosphorus pentachloride and phosphorus oxychloride.

Component (iv)

Component (iv) for preparing a solid catalyst component in accordance with the present invention is an organometal compound of a metal of the Group I to III of the Periodic Table.

The compounds are organometal compounds and thus have at least one organic radical-metal bonding. The organic radical may typically be a hydrocarbyl group of 1 to 10 carbon atoms, preferably 1 to 6 carbon atoms.

The remaining valence of the metal in question other than those satisfied by an organic radical, if any, can be satisfied by a hydrogen atom, a halogen atom, hydrocarbyloxy group of 1 to 10, preferably 1 to 6, carbon atoms, or the metal itself with an oxygen bridge such as

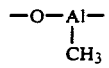

when the compounds are methylalmoxanes.

Specific examples of such organometal compounds may include: (a) organolithium compounds, e.g. methyllithium, n-butyllithium, sec.-butyllithium, tert.-butyllithium and the like; (b) organomagnesium compounds, e.g. diethylmagnesium, ethylbutylmagnesium, dibutylmagnesium, dihexylmagnesium, hexylethylmagnesium, ethylmagnesium chloride, ethylmagnesium bromide, butylmagnesium chloride, tert.-butylmagnesium bromide, and the like; (c) organozinc compounds, e.g. diethylzinc, dimethylzinc, dibutylzinc, and the like; (d) organoaluminum compounds, e.g. trimethylaluminu m, triethylalu mi num , triisobutylaluminum, tri-n-hexylaluminum, diethylaluminum chloride, diethylaluminum hydride, diethylaluminum ethoxide, ethylaluminum sesquichloride, ethylaluminum dichloride, methylaluminoxane, and the like. Among these, organoaluminum compounds are preferable. Further examples of organoaluminum compounds may be found in the examples of organoaluminum compounds as the Component (B) which will be given hereinbelow.

Exemplification of organoaluminum compounds as the component (iv) may be found in the exemplification of organoaluminum compounds for use in the preliminary polymerization or as the component (B).

Examples include:
$Al(C_2H_5)_3$,
$Al(iC_4H_9)_3$,
$Al(nC_4H_9)_3$,
$Al(C_5H_{11})_3$,
$Al(nC_6H_{13})_3$,
$Al(C_8H_{17})_3$,
$Al(C_{10}H_{21})_3$,
$Al(C_2H_5)Cl$, Al(iC$_4$H$_9$)$_2$Cl,
Al(C$_2$H$_5$)$_2$H,
Al(iC$_4$H$_9$)$_2$H,
Al(C$_2$H$_5$)$_2$(OC$_2$H$_5$).

Preparation of the component (A)

The contacting conditions can be as desired, so long as the advantages inherent in the present invention can be attained, but generally the following conditions are preferred. The contact temperature may be about −50 to 200° C., preferably 0° to 100° C. As the contacting method, there may be employed the mechanical method wherein a rotating ball mill, a vibrating ball mill, a jet mill, a medium stirring pulverizer or the like is used and the method in which contact is effected with stirring under the presence of an inert diluent. As the inert diluent to be used, aliphatic or aromatic hydrocarbons and halohydrocarbons, polysiloxane, etc. may be exemplified.

The contacting order and the contacting time of the components (i) to (iv) in preparing the component (A) of the present invention may be any desired one, so long as the advantages inherent in the present invention are attained.

Specific orders of such contact may include those as shown below, where the symbol "+" indicates a contact between the components flanking the symbol, and a washing or rinsing processing can be interposed between the contacts.

(a) component (i) +{component (ii)+component (iii)+component (iv)};
(b) component (i)+{component (iii)+component (iv)+component (ii)};
(c) component (i)+component (iii)+{component (ii)+component (iv)};
(d) component (i)+component (iii)+component (iv)+component (ii);
(e) component (i)+component (iv)+component (ii)+component (iii);
(f) component (i)+component (iv)+component (iii)+component (ii);
(g) component (i)+{component (ii)+component (iii)+component (iv)}+{component (ii)+component (iii) +component (iv)};
(h) component (i)+component (iii)+{component (ii)+component (iv)}+{component (ii)+component (iv)}; and
(i) component (i)+{component (ii)+component (iii)+component (iv)}+{component (ii)+component (iv)}

The quantitative ratio of the components (i) to (iv) can be any desired one, so long as the advantages inherent in the present invention can be attained, but generally preferred to be within the following ranges.

The quantitative ratio of the component (i) to (ii) may be within the range of 0.01 to 1000, preferably 0.1 to 100, in terms of the atomic ratio (silicon/titanium) of the silicon of the component (ii) to the titanium component constituting the component (i).

The component (iv) is used in an amount within the range of 0.01 to 100, preferably 0.1 to 30, in terms of the atomic ratio of the metals {(component (iv)/titanium(component (i)}.

The amount of the component (iii) used may be within the range of 0.01 to 100, preferably 0.1 to 20, in terms of the atomic ratio (S or P/Ti) of the sulfur or phosphorus of the component (iii) to the titanium component constituting the component (i).

Modification of the Component (A) can be applied provided that the advantages inherent in the present invention may not be impaired.

One of the modification comprises use of another component other than Components (i) to (iv) during the process for preparing Component (A), such as methylhydrogenpolysiloxane, ethylborate, aluminum triisopropoxide, aluminum trichloride, silicon tetrachloride, a tetra-valent titanium compound, a trivalent titanium compound, and the like.

Another of the modification comprises use of an ethylenically unsaturated compound such as an olefin and a diene compound having 4 to 20 carbon atoms. Specific examples of olefin compounds may include: ethylene, propylene, 1-butene, 2-butene, isobutylene, 1-pentene, 2-pentene, 2-methyl−1-butene, 3-methyl−1-butene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl−2-pentene, 2-ethyl−1-butene, 2,3-dimethyl−1-butene, 3,3-dimethyl−1-butene, 2,3-dimethyl-2-butene, 1-heptene, 1-octene, 2-octene, 3-octene, 4-octene, 1-nonene, 1-decene, 1 undecene, 1-dodecene, 1-tridecene, 1-tetradecene, 1-pentadecene, 1-hexadecene, 1-heptadecene, 1-octadecene, 1-nonadecene styrene, α-methylstyrene, cyclopentene, norbornene, vinylcyclohexane, vinyltrimethylsilane, allyltrimethylsilane, and the like. Among them, particularly preferred are 1-hexene, 1-octene, 1-decene and styrene.

Specific examples of diene compounds having 4 to 20 carbon atoms, preferably 6 to 14 carbon atoms, may include 1,3-butadiene, isoprene, 1,3-hexadiene, 1,4-hexadiene, 1,5-hexadiene, 1,3-pentadiene, 1,4-pentadiene, 2,4-pentadiene, 2,6-octadiene, cis−2-trans−4-hexadiene, trans-2-trans-4- hexadiene, 1,3-heptadiene, 1,4-heptadiene, 1,5-heptadiene, 1,6-heptadiene, 2,4-heptadiene, dicyclopentadiene, 1,3-cyclohexadiene, 1,4-cyclohexadiene, cyclopentadiene, 3-methyl-1,4-hexadiene, 5-methyl-1,4-hexadiene, 1,7-octadiene, 1,8-nonadiene, 1,9-decadiene, 1,13-tetradecadiene, divinylbenzene, norbornadiene and the like.

Among them, preferred are styrene, α-olefins having 4 to 16 carbon atoms and diene compounds having 6 to 14 carbon atoms.

It may be preferable that these unsaturated compounds polymerize during the course of preparing Component (A), and the Component (A) so prepared may be assumed to be one which has undergone the preliminary polymerization. The amount of the unsaturated compounds is 0.01 to 100 times, preferably 0.1 to 10 times the weight of the Component (A) before the use of the unsaturated compound.

Component (B)

The component (B) is an organoaluminum compound. Specific examples may include those represented by R$^4$$_{3-n}$AlX$_n$ or R$^5$$_{3-m}$Al(OR$^6$)$_m$ (wherein R$^4$ and R$^5$ are each hydrocarbyl groups having about 1 to 20 carbon atoms or hydrogen atom, R$^6$, which may be the same as or different from Rs, is a hydrocarbyl group of about 1 to 20 carbon atoms, X is a halogen atom, n and m are respectively numbers of $0 \leq n < 3$, $0 < m < 3$).

Specifically, there may be included (a) trialkylaluminums such as trimethylaluminum, triethylaluminum, triisobutylaluminum, trihexylaluminum, trioctylaluminum, tridecylaluminum, and the like; (b) alkylaluminum halides such as diethylaluminum monochloride, diisobutylaluminum monochloride, ethylaluminum sesquichloride, ethylaluminum dichloride, and the like; (c) dialkylaluminum hydrides such as diethylaluminum hydride, diisobutylaluminum hydride and the like; (d) aluminum alkoxides such as diethylaluminum ethoxide, diethylaluminum phenoxide, (e) aluminoxanes such as methylalumonoxane, hexaisobutylalumoxane, and the like.

The organoaluminum compounds of (a) to (e) can be used in combination with alkylaluminum alkoxides, such as, for example, alkylaluminum alkoxides represented by the formula: $R^7{}_{3-a}Al(OR^8)_a$ (wherein $1 \leq a \leq 3$, $R^7$ and $R^8$, which may be either the same or different, are each hydrocarbyl groups having about 1 to 20 carbon atoms). For example, there may be included combinations of triethylaluminum with diethylaluminum ethoxide; of diethylaluminum monochloride with diethylaluminum ethoxide; of ethylaluminum dichloride with ethylaluminum diethoxide; and of triethylaluminum, diethylaluminum ethoxide and diethylaluminum chloride.

The amount of the component (B) used may be 0.1 to 1000, preferably 1 to 100, in terms of weight ratio of the component (B)/component (A).

Component (C) (optional)

The catalyst in accordance with the present invention comprises Component (A) and Component (B), and can contain another component which is compatible with the present invention as described hereinabove.

One of such a compatible component is a boron alkoxide having a bond of the formula B—$OR^5$, $R^5$ is an aliphatic or aromatic hydrocarbyl group having about 1 to 20, preferably about 1 to 8 carbon atoms. The balance of the valence of boron is preferably satisfied with the same or different $OR^5$ group, an alkyl group (preferably about $C_1$ to $C_{10}$), a halogen atom (preferably chlorine), or a cyclic hydrocarbyl group Of about $C_6$ to $C_{10}$.

Specific examples of such boron compounds may include:
$B(OCH_3)_3$,
$B(OC_2H_5)_3$,
$B(OC_3H_7)_3$,
$B(OiC_3H_7)_3$,
$B(O-nC_4H_9)_3$,
$B(OC_6H_{13})_3$,
$B(OC_6H_5)_3$,
$B(OC_6H_4(CH_3))_3$,
$B(OC_2H_5)Cl$,
$B(OCH_3)_2Cl$,
$(C_2H_5)B(OC_2H_5)_2$,
$B(C_6H_5)(OCH_3)_2$,
$B(OC_4H_9)Cl_2$, and the like.

Among them, preferable are $B(OCH_3)_3$, $B(OC_2H_5)_3$ and $B(O-nC_4H_9)_3$.

The amount of the component (C) used may be within the range of 0.1 to 40, preferably 1 to 20, in terms of molar ratio relative to the titanium constituting the component (A).

Use of Catalyst Polymerization

Polymerization in general

Not only are the catalysts of the present invention applicable to ordinary slurry polymerization but they may also be used for liquid-phase, solventless polymerization wherein substantially no solvent is used, solution polymerization and vapor-phase polymerization. The catalysts in accordance with the present invention can be used not only in continuous polymerization and batchwise polymerization but also in the polymerization wherein a preliminary polymerization is conducted in which a small amount of an α-olefin is polymerized by the catalyst. In the case of slurry polymerization, aliphatic or aromatic hydrocarbons such as hexane, heptane, pentane, cyclohexane, benzene and toluene are used alone or in combination as the polymerization solvent. The polymerization temperature is from room temperature to about 200° C., preferably from 50 to 150° C., under a pressure of atmospheric to 300 kg/cm², preferably atmospheric to 50 kg/cm², and hydrogen can be used additionally as the molecular-weight regulator. When slurry polymerization is practiced the quantity of the component (A) is preferably 0.001 to 0.1 g.component (A)/liter.solvent.

The olefins to be polymerized with the catalyst systems of the present invention are represented by the general formula:

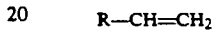

$$R—CH=CH_2$$

wherein R is a hydrogen atom or a hydrocarbyl residue which has 1 to 10 carbon atoms and may contain a branched group.

Specific examples of such olefins may include ethylene, propylene, butene-1, pentene-1, hexene-1, 3-methylbutene-1 and 1,4-methylpentene. Preference is given to ethylene and propylene. In polymerization, ethylene can be copolymerized with the aforesaid olefin in an amount of up to 50 weight %, preferably up to 20 weight % based on ethylene, and propylene with the aforesaid olefin, particularly ethylene, in an amount of up to 30 weight % based on propylene. For such copolymerization, other copolymerizable monomers (e.g., vinyl acetate, diolefins, etc.) can also be used.

Polymerization in two steps

The catalyst in accordance with the present invention is utilized also in production of propylene-ethylene block copolymers as well.

The polymerization utilized in production of the block copolymers comprises step (1) for producing a block of crystalline propylene polymers and step (2) for producing a block of less crystalline or elastomeric propylene polymers or, in other words, propylene-ethylene copolymers. It may be advantageous to practice the step (1) prior to the step (2). The later step, irrespective of which step precedes, is practiced in the presence of a product of the former step. Formation of the catalyst:

The catalyst of the present invention is formed by contacting at once or stepwise the above catalyst Components (A) and (B) (or the catalyst Components (A), (B) and (C)) in the polymerization system or outside the polymerization system, which is irrespective of whether the polymerization is practiced in a single step or in two steps.

The Components (A), (B) (and (C)), preferably Component (B), can be further supplemented at each step.

The Component (C) may be added to the polymerization step (1) and/or polymerization step (2). Preferably the Component (C) may be added before initiation of or during the polymerization step (2).

Polymerization step (1):

The polymerization step (1) is a step in which propylene alone or a propylene/ethylene mixture is fed into a polymerization system having the above catalyst Components (A) and (B) to carry out polymerization in one stage or multiple stages to form a propylene homopolymer or a propylene-ethylene copolymer with an ethylene content of 7% by weight or less, preferably 0.5% by weight or less, in an amount corresponding to 10 to 95% by weight, preferably 20 to 95 by weight, more preferably 30 to 95% by weight, of the total weight of the final polymer to be produced in the polymerization steps (1) and (2).

If the ethylene content in the propylene-ethylene copolymer exceeds 7% by weight produced in the polymerization step (1), the bulk density of the final polymer is lowered and the amount of the low crystalline polymer produced as a by-product is increased to great extent. When the polymers produced in the former step comprise less than 10% by weight of the total polymer produced, quantity of the low crystalline by-product polymers in the final copolymer is increased, too. When the polymers produced in the former step comprise more than 95% by weight of the total polymer produced, on the other hand, no advantage inherent in two step polymerization such as improvement in impact strength of the polymer produced inherent in block copolymers of this nature will be attainable.

The polymerization temperature in the polymerization step (1) may be 30° to 95° C., preferably about 50 to 85° C., and the polymerization pressure is generally within the range of 1 to 50 Kg/cm$^2$G. In the polymerization step (1), it is preferable to control an MFR of the polymer produced in the step with the use of a molecular weight controlling aid such as hydrogen and the like thereby to produce the final polymer endowed with higher flowability.

Polymerization step (2):

The polymerization step (2), when it is carried out in the absence of a solvent or a polymerization medium, is a step in which a propylene/ethylene mixture is polymerized in one stage or multiple stages to form an elastomeric copolymer of propylene with a polymerization ratio (weight ratio) of propylene/ethylene of 90/10 to 10/90, preferably 70/30 to 30/70, wherein the polymerization quantity in this step comprises 90 to 5% by weight, preferably 80 to 20 by weight, more preferably 70 to 30% by weight, of the quantity of the final polymer.

The polymerization step (2), when it is carried out in the presence of a solvent or a polymerization medium, is a step in which a propylene/ethylene mixture or ethylene is polymerized in one stage or multiple stages to form an elastomeric copolymer of propylene with a polymerization ratio (weight ratio) of propylene/ethylene of 90/10, to 0/100, wherein the polymerization quantity in this step comprises 90 to 5% by weight, preferably 80 to 5% by weight, more preferably 70 to 5% by weight, of the quantity of the final polymer.

In this polymerization step (2), further comonomer can additionally be used. For example, an $\alpha$-olefin such as 1-butene, 1-pentene, 1-hexene, or the like can be additionally used.

The polymerization temperature in the polymerization step (2) may be about 30 to 90° C., preferably 50 to 80° C. The polymerization pressure typically used may be within the range of 1 to 50 Kg/cm$^2$G.

In transferring from the polymerization step (1) to the polymerization step (2), it is preferably to purge propylene gas or propylene/ethylene gas mixture and hydrogen gas from the process product of the step (1) before its transfer to the subsequent step.

In the polymerization step (2), the molecular weight controlling agent may be either used or not depending on the purpose.

Polymerization mode:

Irrespective of whether the polymerization is practiced in a single step or in two steps, the process for producing the copolymer according to the present invention can be practiced according to any of the batchwise mode, the continuous mode and the semibatchwise mode. These polymerization modes may be practiced by a method in which polymerization is carried out with the inert solvent as a polymerization medium or a disperstant, a method in which polymerization is carried out with the monomer used itself as a polymerization medium or dispersant, a method in which polymerization is carried out in gaseous monomers without use of any polymerization medium added, or a method in which polymerization is carried out in combination of these.

A preferable polymerization method is such that polymerization is carried out in gaseous monomers without use of a polymerization medium, e.g. such that a fluidized bed of the polymer particles formed is formed by the monomer gas stream or that the polymers formed is stirred by a stirrer in a reaction tank. Propylene block copolymers formed:

The propylene copolymers to be produced upon carrying out polymerization substantially in the absence of a solvent or a polymerization medium according to the present invention in its preferable embodiment contains an elastomeric copolymer of propylene of 20 to 80% by weight, preferably 30 to 70 % by weight, more preferably 35 to 60% by weight. The propylene copolymers to be produced upon carrying out polymerization in the presence of a solvent or a polymerization medium according to the present invention in its preferable embodiment contains an elastomeric copolymer of propylene of 95 to 5% by weight, preferably 80 to 5% by weight, more preferably 70 to 5% by weight. Here, "elastomeric copolymer of propylene" refers to xylene soluble components at 20° C.

The "block copolymer" as herein mentioned does not necessarily mean the ideal form, namely one having the block formed in the step (1) and the block formed in the step (2) existing on one molecular chain, but is inclusive, as conventionally understood, of physical mixtures of the polymers formed in the respective steps and polymers of various forms between such mixtures and the above ideal block copolymer.

[EXPERIMENTAL EXAMPLES]

EXAMPLE 1

[Preparation of Component (A)]

Into a flask thoroughly replaced in it with nitrogen was introduced 200 ml of dehydrated and deoxygenated n-heptane, and subsequently 0.4 mol of MgCl$_2$ and 0.8 mol of Ti(O—nC$_4$H$_9$)$_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours. The solid component formed was washed with n-heptane.

Subsequently into a flask thoroughly replaced in it with nitrogen was introduced 50 ml of n-heptane purified similarly as described above, and the solid component synthesized above was introduced in an amount of 0.24 mol as calculated on Mg atom. Then, a mixture of 25 ml of n-heptane with 0.4 mol of SiCl$_4$ was introduced into the flask at 30° C. over 30 minutes, and the reaction was carried out at 70° C. for 3 hours. After completion of the reaction, the product was washed with n-heptane.

Then, 0.024 mole of phthaloyl chloride in 25 ml of n-heptane was introduced into the flask at 70° C. for 30 minutes and the reaction was conducted at 90° C. for 1 hour. The product was then washed with n-heptane. 12 ml of SiCl$_4$ was then introduced and reacted at 80° C. for 6 hours, after which the product was washed with n-heptane. The solid product produced was found to contain 1.96% of titanium, which was used as Component (i) for preparing Component (A).

Into a flask amply replaced in it with nitrogen was introduced 50 ml of amply purified n-heptane, and then 5 g of the solid component obtained above, Component (i), was introduced. Next, 1.2 ml of (CH$_3$)$_3$CSi(CH$_3$)(OCH$_3$)$_2$ as the silicon compound of the component (ii), 0.1 ml of SOCl$_2$ of the component (iii), and further 3.0 g of triethylaluminum of the component (iv) were respectively introduced and contacted at 30° C. for 2 hours. After completion of the contact, the product was amply washed with n-heptane to provide a component (A).

[Polymerization of propylene]

Into a polymerization vessel with a stirring and a temperature control means of 1.5 liter capacity were introduced 500 ml of amply dehydrated and deoxygenated n-heptane, 100 mg of triethylaluminum of the Component (B) and 10 mg of the above synthesized Component (A). 60 ml of H$_2$ was introduced, and polymerization of propylene was conducted at a temperature of 75° C. and under a pressure of 5 Kg/cm$^2$G for 2 hours, after which the polymer slurry obtained was subjected to filtration and the polymer obtained was dried.

A polymer in a yield of 183.4 g was obtained, and a further crop of a polymer in 0.43 g was obtained from the filtrate. The polymer had a total I.I. (T-I.I.) determined by extraction with boiling n-heptane of 99.1% by weight, an MFR of 1.3 g/10 minutes, a bulk density of 0.48 g/c.c.

EXAMPLE 2

[Synthesis of catalyst Component (A)]

The procedure set forth in Example-1 was followed except for the uses of diheptyl phthalate in place of phthaloyl chloride and of 10 ml of TiCl$_4$ in place of 12 ml of SiCl$_4$ to produce the solid component (i), which was found to contain 2.68% by weight of Ti.

To a flask amply flushed by nitrogen, 50 ml of amply purified n-heptane, 5 g of the component (i) obtained as above, and 0.05 ml of SOCl$_2$ of the component (iii) were subsequently introduced, and were contacted at 20° C. for 2 hours. Then, 0.22 ml of (CH$_3$)$_3$CSi(CH$_3$)(OCH$_3$)$_2$ of the component (ii) and 2.5 g of triethylaluminum of the component (iv) were introduced to contact at 40° C. for 1 hour, after which the product was washed amply with n-heptane to form the component (A).

[Polymerization of propylene]

Polymerization was conducted under the same conditions as in Example-1 except for the quantity of triethylaluminum of the component (B) being 125 mg.

193.3 g of a polymer were obtained having T-I.I. of 99.1% by weight, an MFR of 1 g/10 min. and a polymer bulk density of 0.47 g/cc.

EXAMPLE 3

The procedure set forth in Example 1 was followed for preparing the component (A) except for the use of ethyl benzoate in place of phthaloyl chloride. Polymerization of propylene was conducted also in the same way as in Example 1.

71.4 g of a polymer was obtained having an MFR of 4.6 g/10 min., a T-I.I. of 96.1% by weight and a polymer bulk density (B.D.) of 0.43 g/cc.

EXAMPLES 4 to 6

The procedure set forth in Example 1 was followed for preparing the component (A) except for the use of the components (ii) and (iv) as set forth in Table 1, and polymerization of propylene was conducted also in the same way as in Example 1.

The results obtained are set forth in Table 1.

EXAMPLE 7

[Synthesis of catalyst Component (A)]

The component (i) was prepared in the same way as in Example 1.

To a reaction vessel of a 1.5 liter capacity equipped with a stirring means and a temperature controlling means, 500 ml of n-heptane amply dehydrated and deoxygenated, 2.2 g of triethylaluminum and 20 g of the solid component prepared above were introduced. Propylene was introduced to the vessel (20° C.) at a constant rate for 30 min. to effect polymerization of propylene. After the polymerization, the product was washed amply with n-heptane. A portion of the product was subjected to analysis to show that the product contained 1.32 g of polypropylene per 1 g of the solid component which was the component (i) having undergone the preliminary polymerization.

To a flask amply flushed with nitrogen in it, 50 ml of n-heptane amply purified, 5 g of the component (i) prepared above, and 3.0 g of triethylaluminum of the component (iv) were introduced and were contacted at 30° C. for 1 hour. 0.28 ml of (CH$_3$)$_3$CSi(CH$_3$)(OCH$_3$)$_2$ of the component (ii) was then introduced and was contacted at 40° C. for 1 hour. 0.05 ml of SOCl$_2$ of the component (iii) was then introduced and was contacted at 30° C. for 1 hour. After the contacts, the product was washed amply with n-heptane to give the catalyst Component (A).

[Polymerization of propylene]

The procedure set forth in Example 1 for polymerization was followed except for the polymerization temperature being 80° C.

181.3 g of a polymer was obtained having a T-I.I. of 99.2% by weight, an MFR of 1.9 g/10 min. and a polymer bulk density of 0.45 g/cc.

EXAMPLE 8

The procedure of Example 1 was followed except for the polymerization time being 6 hours, the quantity of triethylaluminum (B) being 80 mg and the quantity of the Component (A) being 7 mg.

The results obtained are set forth in Table 2.

Comparative Example 1

The procedure of Example 1 was followed except for not using SOCl$_2$ of the component (iii).

122.3 g of a polymer was obtained having a T-I.I. of 99.0% by weight, an MFR of 2.2 g/10 min. and a polymer bulk density of 0.43 g/cc.

Comparative Example 2

The procedure of Example 8 was followed except for the use of the Component (A) prepared in Comparative Example 1.

The results obtained are set forth in Table 2.

TABLE 1

| Example No. | Component (ii) (ml) | Component (iii) (ml) | Component (iv) (g) | Polymer yield (g) | T-I.I. (% by weight) | MFR (g/10 min.) | Polymer B.D. (g/cc) |
|---|---|---|---|---|---|---|---|
| 4 | X*1 (0.48) | SO$_2$Cl$_2$ (0.1) | Y*1 (2.6) | 136.6 | 98.2 | 2.1 | 0.47 |
| 5 | X*2 (0.65) | SOCl$_2$ (0.07) | Y*2 (2.3) | 131.4 | 97.9 | 2.3 | 0.46 |
| 6 | X*3 (1.5) | SOCl$_2$ (0.03) | Y*3 (4.5) | 143.2 | 97.8 | 2.8 | 0.45 |

X*1: (CH$_3$)$_3$CSi(OCH$_3$)$_3$
X*2: (CH$_3$)$_3$CSi(OC$_2$H$_5$)$_3$

X*3: 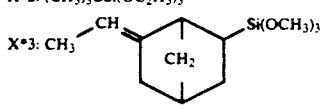

Y*1: tri-n-octylaluminum
Y*2: diethylaluminum chloride
Y*3: triethylaluminum chloride

TABLE 2

| | Polymer Yield (g) | T-I.I. (% by weight) | MFR (g/10 min) | Polymer B.D. (g/cc) |
|---|---|---|---|---|
| Example No. 8 | 229.4 | 98.6 | 1.2 | 0.48 |
| Comp. Ex. 2 | 183.6 | 98.2 | 2.3 | 0.47 |

EXAMPLE 9

[Synthesis of Component (A)]

Into a flask thoroughly replaced in it with nitrogen was introduced 200 ml of dehydrated and deoxygenated n heptane, and subsequently 0.4 mol of MgCl$_2$ and 0.8 mol of Ti(O—nC$_4$H$_9$)$_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours, the solid component formed was washed with n-heptane.

Subsequently into a flask thoroughly replaced in it with nitrogen was introduced 50 ml of n-heptane purified similarly as described above, and the solid component synthesized above was introduced in an amount of 0.24 mole as calculated on Mg atom. Then, a mixture of 25 ml of n-heptane with 0.4 mole of SiCl$_4$ was introduced into the flask at 30° C. over 30 minutes, and the reaction was carried out at 70° C. for 3 hours. After completion of the reaction, the produce was washed with n-heptane.

Then, 0.024 mole of phthaloyl chloride in 25 ml of n-heptane was introduced into the flask at 70° C. for 30 minutes and the reaction was conducted at 90° C. for 1 hours. The product was then washed with n-heptane, and 12 ml of SiCl$_4$ were introduced and the reaction was conducted at 80° C. for 6 hours. The product was washed amply with n-heptane to produce Component (i), which was found to contain 1.96% by weight of titanium.

Into a flask amply flushed with nitrogen, 50 ml of n-heptane and 5 g of the Component (i) prepared as above were introduced, and 1.2 ml of (CH$_3$)$_3$C Si(CH$_3$)(OCH$_3$)$_z$ of Component (ii), 0.1 ml of PCl$_3$ of Component (iii) and 3.0 g of triethylaluminum (TEA) of Component (iv) were introduced and were contacted at 30° C. for 2 hours. The product was then washed with n-heptane to form Component (A).

[Polymerization of propylene]

The procedure set forth in Example-1 was followed except for the uses of 10 mg of the above-synthesized catalyst Component (A) and of 100 mg of TEA of Component (B) for polymerization of propylene.

The polymer slurry obtained was separated by filtration, and the polymer was dried to obtain 181.4 g of a dry polymer. Separately, 0.46 g of a polymer was recovered from the filtrate. T-I.I. was 99.0% by weight, MFR was 1.5 g/10 min, the bulk density was 0.46 g/cc.

EXAMPLE 10

[Synthesis of Component (A)]

In the production of Component (A) in Example 9, diheptyl phthalate was used in place of phthaloyl chloride and 10 ml of TiCl$_4$ was used in place of 12 ml of SiCl$_4$ to produce the solid component (i), which was found to contain 2.68% by weight of titanium.

Into a flask apply flushed by nitrogen, 50 ml of n-heptane, 5 g of the solid component (i) prepared as above, and 0.2 ml of PCl$_3$ of the component (iii) were introduced and were contacted at 20° C. for 2 hours. After the contact, 0.53 ml of (CH$_3$)$_3$CSi(CH$_3$)(OCH$_3$)$_2$ of the component (ii) and 3.0 g of TEA of the component (iv) were introduced and contacted at 40° C. for 1 hour. The product was then amply washed with n-heptane to produce Component (A).

[Polymerization of propylene]

In the polymerization of propylene in Example 9, the quantity of Component (B) was changed to 125 mg, and the polymerization was conducted. 189.6 g of polymer was obtained having a T-I.I. of 99.0% by weight, an MFR of 1.8 g/10 min., and a polymer bulk density of 0.47 g/cc.

EXAMPLE 11

The procedure set forth in Example 9 was followed except for the use of ethyl benzoate in place of phthaloyl chloride in preparing the Component (A).

70.7 g of a polymer was obtained having an MFR of 4.4 g/10 min., a T-I.I. of 96.2% by weight and a polymer bulk density of 0.44 g/cc,

EXAMPLES 12-14

The procedure set forth in Example 9 was followed except for the type and quantity of the component (ii) and the component (iv) set forth in the Table 3 being used.

The results obtained are set forth in Table 3.

EXAMPLE 15

[Synthesis of Component (A)]

according to the procedure set forth in Example 9.

Into a reaction vessel made of stainless steel of a capacity of 1.5 liters equipped with a stirring means and temperature-control means, 500 ml of n-heptane amply dehydrated and deoxygenated, 2.2 g of TEA and 20 g of the solid component prepared as above were introduced. At an inside temperature of the vessel of 20° C., propylene was introduced at a constant rate for 30 min. to conduct polymerization of propylene. After the polymerization, the product was washed amply with n-heptane to give the component (i) which had undergone preliminary polymerization and which had 1.32 g of polypropylene per g of the solid component.

Into a flask amply flushed with nitrogen, 50 ml of n-heptane amply purified, 5 g of the solid component (i) prepared as above, and 3.0 g of TEA of the component (iv) were introduced and were contacted at 30° C. for 1 hour. 0.28 ml of $(CH_3)_3CSi(CH_3)(OCH_3)_2$ of the component (ii) was then introduced and contacted at 40° C. for 1 hour. 0.22 ml of $PCl_3$ of the component (iii) was introduced and contacted at 30° C. for 1 hour. After the contact, the product was washed amply with n-heptane to give Component (A).

[Polymerization of propylene]

The procedure set forth in Example 10 was followed except for the polymerization temperature being 80° C.

172.6 g of a polymer was obtained having a T-I.I. of 99.1% by weight, an MFR of 2.0 g/10 min., and a polymer bulk density of 0.45 g/cc.

EXAMPLE 16

The procedure set forth in Example 9 was followed except for the polymerization time being 6 hours, the quantity of TEA of Component (B) being 80 mg and the quantity of Component (A) being 7 mg.

The result obtained is set forth in Table 4.

TABLE 4

|  | Polymer Yield (g) | T-I.I. (% by weight) | MFR (g/10 min) | Polymer B.D. (g/cc) |
|---|---|---|---|---|
| Example No. 16 | 221.6 | 98.4 | 1.3 | 0.47 |
| Comp. Ex. 2 | 183.6 | 98.2 | 2.3 | 0.47 |

EXAMPLE 17

[Preparation of component (A)]

The component (A) was prepared as in Example 1.

[Copolymerization of propylene]

According to the process disclosed in Japanese Patent Publication No. 33721/1986, copolymerization of propylene was carried out wherein a horizontal biaxial gas phase polymerization vessel of 13-liter volume was used.

After replacement of the polymerization vessel with thoroughly purified nitrogen, 400 g of an amply dehydrated and deoxygenated polymer carrier was added. Subsequently, 500 mg of triethylaluminum of the component (B) and 120 mg of the above synthesized component (A) were introduced. In the polymerization step (1) of the first stage, after introduction of 1000 ml of hydrogen, at a temperature controlled to 75° C., propylene was introduced at a constant rate of 1.3 g/min. The stirring rotation of the polymerization vessel was 350 r.p.m. The polymerization temperature was maintained at 75° C. and, after 3 hours and 40 minutes, introduction of propylene was stopped. Polymerization was continued at 75° C., and when the polymerization pressure became 1 Kg/cm$^2$G, a small amount of the polymer sample was collected.

Then, 500 ml of $H_2$ was added to initiate the polymerization step (2). The second stage polymerization was carried out by introducing 0.59 g/min. of propylene and 0.40 g/min. of ethylene respectively at constant rates at 70° C. for 1 hour and 36 minutes. Introduction of propylene and ethylene was stopped, and polymerization under the residual pressure was carried out until the polymerization pressure became 1 Kg/cm$^2$G. After completion of polymerization, the polymer was taken out after purging the process product to give 372 g of a polymer. The polymer formed had an MFR of 8.1 g/10 min., a polymer bulk density (B.D.) of 0.41 g/cc, and a polymer falling speed of 7.3 sec. The weight of the elastomeric or rubbery copolymer was 23.5% by weight.

There was no polymer adherence in the polymerization vessel at all, and the intermediate sample had an MFR of 17.4 g/10 min.

The "polymer falling speed" means the time required for falling of 50 g of the polymer from an opening of 1.8 cm$^2$.

TABLE 3

| Example No. | Component (ii) (ml) | Component (iii) (ml) | Component (iv) (g) | Polymer yield (g) | T-I.I. (% by weight) | MFR (g/10 min.) | Polymer B.D. (g/cc) |
|---|---|---|---|---|---|---|---|
| 12 | X*1 (0.48) | $(C_2H_5O)POCl_2$ (0.23) | Y*1 (2.1) | 121.4 | 97.6 | 2.3 | 0.44 |
| 13 | X*2 (0.65) | $(C_6H_5)PCl_2$ (0.16) | Y*2 (2.4) | 114.5 | 97.7 | 2.5 | 0.43 |
| 14 | X*3 (1.5) | $PCl_3$ (0.15) | Y*3 (4.3) | 133.3 | 97.5 | 3.1 | 0.44 |

X*1, X*2, X*3, Y*1, Y*2 and Y*3 are the same as those used in Table 1.

EXAMPLE 18

[Synthesis of catalyst component (A)]

In entirely the same manner as in Example 1, contact between the components (i)-(iv) was effected, and then 3.5 ml of 1,5-hexadiene was added to carry out the reaction at 30° C. for 2 hours. After completion of the reaction, the product was washed with heptane to provide a catalyst component (A).

[Copolymerization of propylene]

In the polymerization conditions in Example 19, the polymerization time in the polymerization step (1) was changed to 3 hours and 30 minutes, and the polymerization time in the polymerization step (2) to 1 hour and 50 minutes, and following otherwise the same procedure, polymerization was carried out. An amount of 379 g of a polymer was obtained, with MFR=7.5 g/10 min., polymer B.D.=0.48 g/cc and polymer falling speed 6.2 sec. The weight of the rubbery copolymer was 29.3% by weight.

There was no polymer adherence in the polymerization vessel at all.

EXAMPLE 19

[Synthesis of component (A)]

In entirely the same manner as in Example 1, contact of the components (i)-(iv) was effected, followed by washing with heptane, to give a solid component. Subsequently, with addition of 1.5 g of styrene, the reaction was carried out at 30° C. for 2 hours, and after completion of the reaction, the product was washed with heptane to give a catalyst component (A).

[Copolymerization of propylene]

In the polymerization conditions in Example 17, the polymerization time in the polymerization step (1) was changed to 3 hours and 10 minutes, and the polymerization time in the polymerization step (2) to 1 hour and 50 minutes, and following otherwise the same procedure, polymerization was carried out. An amount of 382 g of a polymer was obtained, with MFR=7.1 g/10 min., polymer B.D.=0.40 g/cc and a polymer falling speed=6.7 sec. The weight of the rubbery copolymer was 35.3% by weight.

EXAMPLE 20

[Synthesis of Component (A)]

The procedure set forth in Example 1 was followed except for the use of 6.0 millimoles of $(CH_3)_3CSi(CH_3)(OC_2H_5)_2$ of component (ii), 0.75 g (3.6 millimoles) of phosphorus pentachloride of the component (iii) and 25 millimoles of diethylzinc of the component (iv) were used.

[Copolymerization of propylene]

Copolymerization of propylene was conducted as in Example 17.

372 g of a polymer was obtained having an MFR of 7.5 g/10 min., and a polymer bulk density of 0.40 g/cc. The polymer falling speed was 6.7 sec. The weight of the

EXAMPLE 21

[Synthesis of Component (A)]

Procedure set forth in Example 1 was followed for synthesizing Component (A).

[Copolymerization of propylene]

An autoclave of 1.5 liter-capacity equipped with a stirrer was purged with propylene, to which 500 ml of amply dehydrated and deoxygenated n-heptane was introduced and then, 20 mg of the above Component (A) and 125 mg of triethylaluminum as Component (B) were introduced under propylene atmosphere.

The former step polymerization was conducted so that 200 ml of hydrogen was introduced into the autoclave, the temperature was elevated to 75° C., and propylene was fed at a constant rate of 0.917 g/min. After 3 hours, introduction of propylene was terminated and polymerization was continued at 75° C. until the pressure was 2-kg/cm$^2$·G, where the polymer produced was sampled as an intermediate polymer. The gas phase was then extracted until the pressure reached 0.2 kg/cm$^2$·G, and propylene and ethylene were fed at constant rates of 0.133 g/min. and 0.200 g/min., respectively, at 65° C. for 1.5 hours. Polymerization was continued until the pressure became to 1.0 kg/cm$^2$·G.

After the polymerization, the gas phase in the autoclave was blown off, and the slurry obtained was subjected to filtration and drying to give 173.5 g of a polymer. The filtrate obtained gave, upon drying, 3.96 g of a low crystalline by-product polymer. MFR and bulk density of the polymer obtained was 9.2 g/10 min. and 0.436 g/c.c., respectively. The sampled intermediate polymer had, upon drying, MFR of 21.5 g/10 min. The angle of repose of the polymer was 36.3°. The yield obtained was 9,800 g polymer/g-solid catalyst.

EXAMPLE 22

[Preparation of Component (A))

Into a flask thoroughly flushed with nitrogen was introduced 200 ml of dehydrated and deoxygenated n-heptane, and subsequently 0.4 mol of $MgCl_2$ and 0.8 mol of $Ti(O-nC_4H_9)_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours. The solid component formed was washed with n-heptane.

Subsequently into a flask thoroughly purged with nitrogen was introduced 50 ml of n-heptane purified similarly as described above, and the solid component synthesized above was introduced in an amount of 0.24 mol as calculated on Mg atom. Then, a mixture of 25 ml of n-heptane with 0.8 mol of $SiCl_4$ was introduced into the flask at 15° C. over 60 minutes, and the reaction was carried out at 90° C. for 3 hours. After completion of the reaction, the product was washed with n-heptane to give the component (i).

Into a flask amply flushed with nitrogen was introduced 50 ml of amply purified n-heptane, and then 5 g of the solid component obtained above, Component (i), was introduced. Next, 1.2 ml of $(CH_3)_3CSi(CH_3)(OCH_3)_2$ as the silicon compound of the component (ii), 0.1 ml of $SOCl_2$ of the component (iii), and further 3.0 g of triethylaluminum of the component (iv) were respectively introduced and contacted at 30° C. for 2 hours. After completion of the contact, the product was amply washed with n-heptane to provide a solid component, which was further contacted with the components (ii) to (iv) in the same quantity respectively and washed amply with n-heptane to give the Component (A).

[Polymerization of propylene]

The procedure set forth in Example 1 was followed. 95.1 g of a polymer was obtained having a T-I.I. of 97.9% by weight, an MFR of 2.6 g/10 min., and a polymer bulk density of 0.47 g/cc.

EXAMPLE 23

[Preparation of Component (A)]

Into a flask thoroughly purged with nitrogen was introduced 200 ml of dehydrated and deoxygenated n-heptane, and subsequently 0.4 mol of $MgCl_2$ and 0.8 mol of $Ti(O-nC_4H_9)_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours, the solid component formed was washed with n-heptane.

Subsequently into a flask thoroughly purged with nitrogen was introduced 50 ml of n-heptane purified similarly as described above, and the solid component synthesized above was introduced in an amount of 0.24 mol as calculated on Mg atom. Then, a mixture of 25 ml of n-heptane with 0.05 mol of $SiCl_4$ was introduced into the flask at 30° C. over 30 minutes, and the reaction was carried out at 70° C. for 3 hours. After completion of the reaction, the produce was washed with n-heptane.

Into a flask purged with nitrogen were introduced 50 ml of n-heptane amply purified, 5 g of the above-synthesized Component (i), 1.2 m l of $(CH_3)_3CSi(CH_3)(OCH_3)_2$ of Component (ii), 0.05 ml of $PCl_3$ of Component (iii) and 3.0 g of triethylaluminum (TEA) of Component (iv), and were contacted at 30° C. for 2 hours. The product was then washed with n-heptane to form a solid component, which was further contacted with the components (ii) to (iv) in the same quantity respectively and washed amply with n-heptane to give the Component (A).

[Polymerization of propylene]

The procedure set forth in Example 1 was followed. 94.7 g of a polymer was obtained having a T-I.I. of 97.6% by weight, an MFR of 2.8 g/10 min., and a polymer bulk density of 0.46 g/cc.

What is claimed is:

1. A solid catalyst component for an olefin polymerization catalyst, which solid catalyst component is obtained by contacting the following Components (i) to (iv):

Component (i) which is a solid catalyst component for Ziegler-type catalysts comprising titanium, magnesium and a halogen as the essential components;

Component (ii) which is a silicon compound represented by a formula

wherein $R^1$ indicates a branched hydrocarbyl group, $R^2$ which may be the same as or different from $R^1$ indicates a hydrocarbyl group, $R^3$ which may be the same as or different from $R^1$ and/Or $R^2$ indicates a hydrocarbyl group, and n is a number satisfying an equation $1 \leq n \leq 3$;

Component (iii) which is a halogen compound of sulfur or phosphorus and

Component (iv) which is an organometal compound of a metal of the Groups I to III of the Periodic Table.

2. The solid catalyst component for an olefin polymerization catalyst as claimed in claim 1 wherein the silicon compound of Component (ii) is such that $R^1$ is a hydrocarbyl group of 3 to 20 carbon atoms, and $R^2$ is a hydrocarbyl of 1 to 4 carbon atoms.

3. The solid catalyst component for an olefin polymerization catalyst as claimed in claim 1 wherein the silicon compound of Component (ii) is such that $R^1$ has an α-carbon atoms, through which $R^1$ is bound to the silicon atom, which is a secondary or tertiary carbon atom.

4. The solid catalyst component for an olefin polymerization catalyst as claimed in claim 3 wherein the carbon atom through which $R^1$ is bound to the silicon atom is a tertiary carbon atom.

5. The solid catalyst component for an olefin polymerization catalyst an claimed in claim 1 wherein the Component (iii) is selected from the group consisting of $SOCl_2$ and $SO_2Cl_2$.

6. The solid catalyst component for an olefin polymerization catalyst as claimed in claim 1 wherein the Component (iii) is selected from the group consisting of phosphorus trichloride, phosphorus pentachloride and phosphorus oxychloride.

7. The solid catalyst component for an olefin polymerization catalyst as claimed in claim 1 wherein the Component (iv) is such that the organometal compound has an organic radical of 1 to 10 carbon atoms to satisfy at least one of the valences of the metal, the remaining of the valences of the metal being satisfied by a monovalent radical selected from the group consisting of a hydrogen atom, a halogen atom, a hydrocarbyloxy group of 1 to 10 carbon atoms and a radical which is to be bound to the metal through an oxygen bridge and comprises the metal in question.

8. The solid catalyst component for an olefin polymerization catalyst as claimed in claim 1 wherein the Component (iv) is such that the organometal has a metal selected from the group of Li, Mg, Zn, and Al.

9. The solid catalyst component for an olefin polymerization catalyst as claimed in claim 8 wherein the metal is Al.

10. The solid catalyst component for an olefin polymerization catalyst as claimed in claim 1 wherein the Component (i) is such that it comprises an electron donor compound introduced when the Component (i) is prepared.

11. The solid catalyst component for an olefin polymerization catalyst as claimed in claim 1 wherein the relative quantities of the Components (i) to (iv) are:
   (a) Si/Ti atomic ratio in Component (ii)/Component (i) is 0.01 to 1000;
   (b) The sulfur or phosphorus/Ti atomic ratio in Component (ii)/Component (i) is 0.01 to 100; and
   (c) The Al/Ti atomic ratio in Component (iv)/Component (i) is 0.01 to 100.

12. A catalyst for polymerizing α-olefins which comprises the following Components (A) and (B):
   Component (A) which is a solid catalyst component for an olefin polymerization catalyst, which solid catalyst component is obtained by contacting the following Components (i) to (iv):

Component (i) which is a solid catalyst component for Ziegler-type catalysts comprising titanium, magnesium and halogen as the essential components;

Component (ii) which is a silicon compound represented by a formula $R^1R^2{}_{3-n}Si(OR^3)_n$ where $R^1$ indicates a branched hydrocarbyl group, $R^2$ which may be the same as or different from $R^1$ indicates a hydrocarbyl group, $R^1$ which may be the same as or different from $R^1$ and/or $R^2$ indicates a hydrocarbyl group, and n is a number satisfying an equation $1 \leq n \leq 3$;

Component (iii) which is a halogen compound of sulfur or phosphorus and

Component (iv) which is an organometal compound of a metal of Groups I to III of the Periodic Table; and Component (B) which is an organo-aluminum compound.

13. The catalyst for polymerizing α-olefins as claimed in claim 12 wherein the silicon compound of Component (ii) is such that $R^1$ is a hydrocarbyl group of 3 to 20 carbon atoms, and $R^2$ is a hydrocarbyl Of 1 to 4 carbon atoms.

14. The catalyst for polymerizing α-olefins as claimed in claim 12 wherein the silicon compound of Component (ii) is such that $R^1$ has an c-carbon atoms, through which $R^1$ is bound to the silicon atom, which is a secondary or tertiary carbon atom.

15. The catalyst for polymerizing α-olefins as claimed in claim -14 wherein the carbon atom through which $R^1$ is bound to the silicon atom is a tertiary carbon atom.

16. The catalyst for polymerizing α-olefins as claimed in claim 12 wherein the Component (iii) is selected from the group consisting of $SOCl_2$ and $SO_2Cl_2$.

17. The catalyst for polymerizing α-olefins as claimed in claim 12 wherein the Component (iii) is selected from the group consisting of phosphorus trichloride, phosphorus pentachloride and phosphorus oxychloride.

18. The catalyst for polymerizing α-olefins as claimed in claim 12 wherein the Component (iv) is such that the organometal compound has an organic radical of 1 to 10 carbon atoms to satisfy at least one of the valences of the metal, the remaining of the valences of the metal being satisfied by a monovalent radical selected from the group consisting of a hydrogen atom, a halogen atom, a hydrocarbyloxy group of 1 to 10 carbon atoms and a radical which is to be bound to the metal through an oxygen bridge and comprises the metal in question.

19. The catalyst for polymerizing α-olefins as claimed in claim 12 wherein the Component (iv) is such that the organometal has a metal selected from the group of Li, Mg, Zn, and Al.

20. The catalyst for polymerizing α-olefins as claimed in claim 19 wherein the metal is Al.

21. The catalyst for polymerizing α-olefins as claimed in claim 12 wherein the Component (i) is such that it comprises an electron donor compound introduced when the Component (i) is prepared.

22. The catalyst for polymerizing α-olefins as claimed in claim 12 wherein the relative quantities of the Components (i) to (iv) are:

(a) Si/Ti atomic ratio in Component (ii)/Component (i) is 0.01 to 1000;

(b) The sulfur or phosphorus/Ti atomic ratio in Component (iii)/Component (i) is 0.01 to 100; and (c) The Al/Ti atomic ratio in Component (iv)/Component (i) is 0.01 to 100.

23. The catalyst for polymerizing α-olefins as claimed in claim 12 wherein the Component (B) is an organoaluminum compound selected from those represented by a formula:

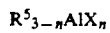

wherein $R^5$ is a hydrocarbyl group having 1 to 20 carbon atoms, X is a halogen atom, and n is a number satisfying an equation: $0 \leq n < 3$, and

wherein $R^6$ is a hydrocarbyl group having 1 to 20 carbon atoms or a hydrogen atom, $R^7$ which is the same as or different from $R^6$ is a hydrocarbyl group having 1 to 20 carbon atoms, and m is a number satisfying an equation:

$0 < m < 3.$

24. The catalyst for polymerizing α-olefins as claimed in claim 12 which further comprises Component (C) which is a boron hydrocarbyloxide which has at least one hydrocarbyl group attached to the boron atom, which hydrocarbyl group has 1 to 20 carbon atoms, the remaining valence of the boron being satisfied by a monovalent radical selected from the group consisting of an alkyl of 1 to 10 carbon atoms which may be linear or cyclic and a halogen atom.

* * * * *